UNITED STATES PATENT OFFICE.

BALDWIN LATHAM, OF WESTMINSTER, ENGLAND.

IMPROVEMENT IN PURIFYING SEWAGE, &c.

Specification forming part of Letters Patent No. 145,111, dated December 2, 1873; application filed May 8, 1873.

*To all whom it may concern:*

Be it known that I, BALDWIN LATHAM, of No. 7 Westminster Chambers, Victoria street, Westminster, in the county of Middlesex, England, have invented an Improvement in Purifying Sewage and Treating Products obtained therefrom for the Production of Manure; and do hereby declare that the following description forms a full and exact specification of the same, wherein I have set forth the nature and principles of my said improvement, by which my invention may be distinguished from others of a similar class, together with such parts as I claim and desire to secure by Letters Patent—that is to say:

My invention relates to the purification of sewage, and the extraction of a manure of considerable value therefrom, by making use of the precipitate which has been removed from sewage by various known processes in which precipitating agents are employed, such as lime, sulphate or sesquisulphate or phosphate of alumina, lime, and magnesia, salts of metals, alkalies, and carbon, and various mixtures of such ingredients wherein phosphates are employed.

For the purpose of my invention, the sewage is first treated by any of the processes indicated above; but by preference I treat it with sulphate or sesquisulphate of alumina in conjunction with lime or chalk, according to the process described in the specification of M. F. Anderson's English patent, dated 8th December, 1869, No. 3,550, whereby a precipitate is obtained containing hydrated oxide of alumina, phosphates of lime and alumina, organic and other matters. I separate this precipitate by subsidence or other known means, and remove it from the tanks in which the sewage has been treated, and I dry the precipitate by any suitable known process to a certain extent, leaving sufficient moisture in it so that after standing for a time the catalytic action of the earthy matter present causes the organic matter to be changed into humus, mold, and other inoffensive products. In some cases, however, it is not necessary for the matter to lie for a time, as it may be thoroughly dried and used at once in carrying out my process. When the catalytic action is complete, or when the deposit has been dried, the compound is treated with sulphuric, hydrochloric, or other acids, but by preference with sulphuric acid, which converts the oxide of alumina into sulphate and sesquisulphate of alumina, and the phosphates of alumina and lime into superphosphates, and also carbonizes the organic matter. The proportion of acid will vary greatly, according to the quality of the sewage and the precipitate removed from it, the limits being from about one part to ten parts, by weight, of the compound to one part, by weight, of acid. The compound thus treated is then mixed with water or sewage liquid, and the mixture is added to the sewage to be acted on; or it may be mixed in the dry state with the sewage to be treated.

Should the sewage not be sufficiently alkaline to neutralize the acid in the compound, I add any suitable alkali in sufficient quantity for neutralizing it, using by preference lime produced by burning magnesian limestone. The proportion of the compound to be added to the sewage will vary considerably, according to the quality of the sewage and the nature of the precipitate derived from the original sewage. Thus one part, by weight, of the compound may be used with from five hundred to ten thousand parts, by weight, of sewage; but I do not limit myself to these proportions.

On the addition of the lime or other alkali, an immediate combination takes place between the lime and sulphuric acid, of the sulphate and sesquisulphate of alumina, and of the superphosphates of alumina and lime, and phosphate of alumina and lime and hydrated oxide of alumina are precipitated. At the same time the flocculent deposit formed by the compound in separating from the sewage drags down the suspended matters of the sewage, and the carbonized or organic matter and humus or mold of the compound added absorbs a portion of the ammonia of the sewage, which is carried down with the deposit. The deposit thus produced may then be dried, and either be used itself as a manure, or it may be treated with sulphuric acid, in order to render it soluble and fix the ammonia compounds, and to render soluble the phosphates; or the compound may be again dried and treated, and applied to a fresh quantity of sewage; but before being again treated with acid it may be charred or carbonized in retorts, and the ammonia collected by any known process, when it may be again treated with acid, and used in the above-described manner; and this operation may be repeated until a manure of a sufficient degree of richness or concentration is obtained.

The precipitate produced by this process may, either before or after being dried, be mixed with precipitated or deposited matter obtained from sewage by screening or subsidence, or any other known process, for the purpose of forming a manure.

The effluent water, after the application of this process, may be applied to the irrigation of land, or may be purified by further precipitation, or by known processes of filtration; also, the effluent water, after the application of other known processes to sewage, may be treated according to the process which I have described above, for its further purification and for the production of a precipitate from it.

Having thus described the nature of my invention, and in what manner the same is to be carried into practical effect, I would have it understood that I do not claim, generally, the use of matter precipitated from sewage as a precipitant; but

I claim—

The process of purifying sewage by treating the same with sewage-precipitate previously dried and carbonized, substantially in the manner set forth.

In testimony whereof I have signed my name to this specification in the presence of two subscribing witnesses this 8th day of April, 1873.

BALDWIN LATHAM.

Witnesses:
  CHAS. D. ABEL,
  ARTHUR SMITH.